Figure 1:
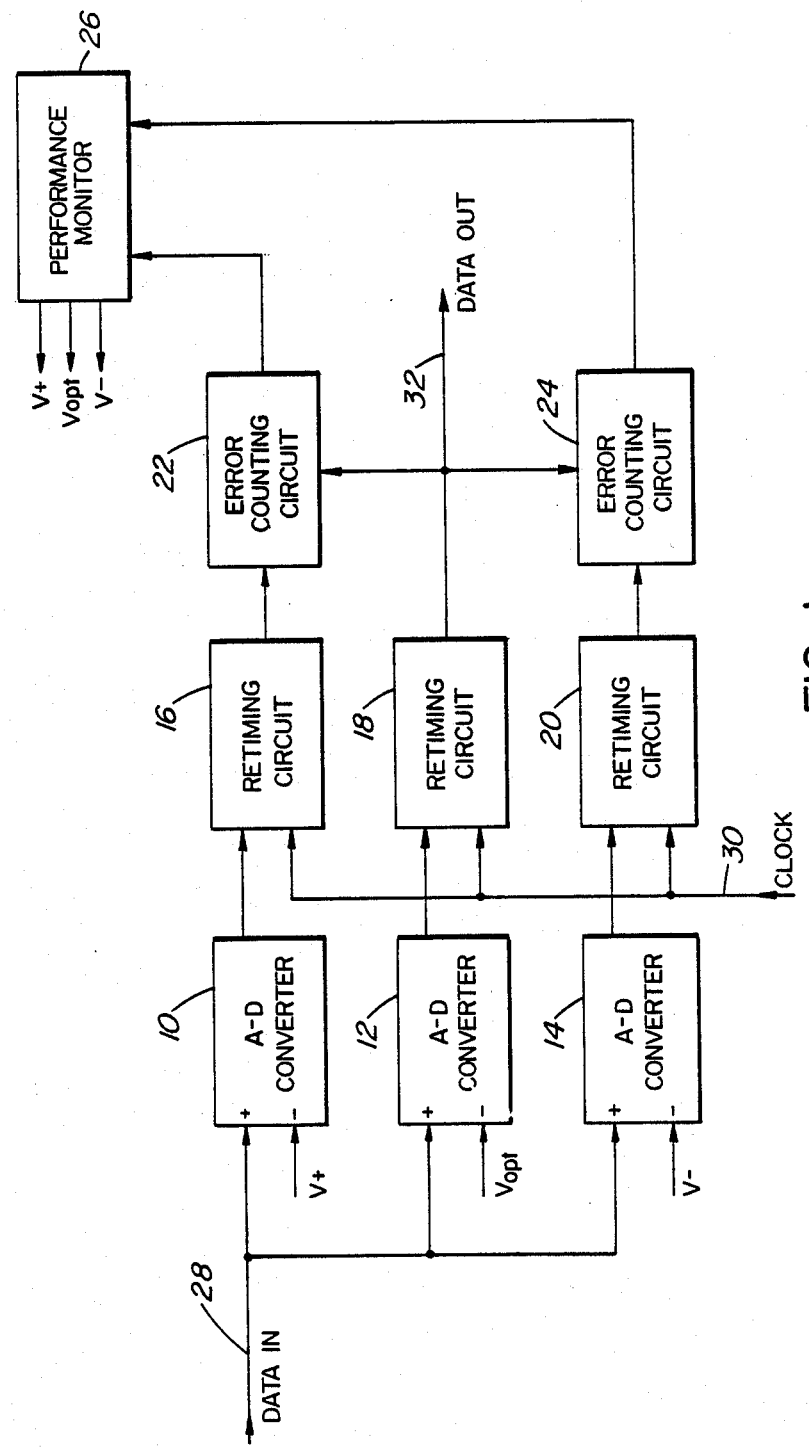

United States Patent [19]

Tremblay et al.

[11] Patent Number: 4,823,360
[45] Date of Patent: Apr. 18, 1989

[54] BINARY DATA REGENERATOR WITH ADAPTIVE THRESHOLD LEVEL

[75] Inventors: Yves Tremblay; David J. Nicholson, both of Nepean, Canada

[73] Assignee: Northern Telecom Limited, Montreal, Canada

[21] Appl. No.: 155,413

[22] Filed: Feb. 12, 1988

[51] Int. Cl.[4] .............................................. H04L 25/06
[52] U.S. Cl. ........................................ 375/4; 307/359; 328/164; 375/10; 375/76
[58] Field of Search ............... 375/76, 4, 10; 358/282; 307/358, 359; 328/115, 116, 164

[56] References Cited

U.S. PATENT DOCUMENTS

| | | | |
|---|---|---|---|
| 4,007,382 | 2/1977 | Warberg | 307/359 |
| 4,097,697 | 6/1978 | Harman . | |
| 4,162,454 | 7/1979 | Olsen | 307/359 |
| 4,571,547 | 2/1986 | Day | 307/359 |

Primary Examiner—Benedict V. Safourek
Attorney, Agent, or Firm—R. John Haley

[57] ABSTRACT

A binary data signal is regenerated with respect to three threshold levels, one of which is derived from and lies between the other two so that it is an optimum level for producing a regenerated output signal. Two control loops are used to produce the other two threshold levels to produce regenerated signals with predetermined error rates, the errors occurring on the two control loops for the two respective states of the binary data signal, whereby the optimum threshold level is maintained regardless of the nature of signal degradation. The arrangement provides rapid performance monitoring which can also be used to adjust other parameters, such as detector bias, equalizer tuning, and clock phase, for optimum performance in an active and ongoing manner.

10 Claims, 4 Drawing Sheets

BINARY DATA REGENERATOR WITH ADAPTIVE THRESHOLD LEVEL

This invention relates to data regenerators, and is particularly concerned with a data regenerator having an adaptive threshold level for the regeneration of binary data signals.

It is well known that transmitted signals suffer degradation from such factors as noise, inter-symbol interference, and distortion during transmission, and that the extent of such degradation can be represented in an eye closure diagram, which is essentially a plot of signal amplitude against time. For a binary data signal, such a diagram has a single eye which is open or closed to an extent determined by the signal degradation. For optimum regeneration of the signal, it is desired to sample the signal with respect to an amplitude decision or threshold level and at a time positioned optimally within the open part of the eye closure diagram.

Transmission rates of data signals have increased progressively, and increasingly fast and more sensitive transmission systems are desired. This has led to the use, for example, of optical fiber transmission systems providing transmission rates in excess of 1 Gb/s using wavelengths of the order of 1.3 $\mu$m and using avalanche photodiode (APD) detectors. For such systems, for a given bit error rate (BER) the receiver sensitivity, and hence the necessary optical power supplied to the detector, is quite dependent upon the threshold level which is used for data signal regeneration. For example, a threshold level variation of only 8% can result in a variation in receiver sensitivity, (defined with a BER of $10^{-9}$) of up to about 1 dB.

Currently, a binary data regenerator is preset with a fixed threshold level (also referred to as a slicing level) to provide the best BER at a predetermined signal power level. Generally, the same conditions will not prevail in use of the regenerator, especially considering the effects of temperature and aging, so that the preset threshold level is not optimal. In consequence, transmission systems must be provided using higher signal power levels, and consequently closer repeater spacings, than would otherwise be needed.

An example of a known data regenerator, which also provides a performance monitor, is described in Harman U.S. Pat. No. 4,097,697 issued June 27, 1978, entitled "Digital Signal Performance Monitor", and assigned to Northern Telecom Limited. In this known arrangement a first differential amplifier clocked by a recovered clock signal regenerates the data signal by comparing the incoming binary data signal with a fixed slicing or threshold level. A second similarly clocked differential amplifier compares the incoming binary data signal with an offset slicing level to produce an errored regenerated signal, the two regenerated signals being compared and the result being fed back via integrating and control circuitry to determine the offset. The amount of the offset is a measure of the degradation of the incoming signal.

An object of this invention is to provide an improved data regenerator.

According to this invention there is provided a regenerator comprising: means for regenerating a data signal with respect to first, second and third threshold levels to produce respectively first, second, third regenerated signals; means for controlling the first threshold level in dependence upon differences between the first and second regenerated signals; means for controlling the third threshold level in dependence upon differences between the second and third regenerated signals; and means for determining the second threshold level, the means for determining the second threshold level being responsive to the first and third threshold levels to produce the second threshold level therebetween.

Advantageously the means for controlling the first and third threshold levels comprise means for maintaining the first and third regenerated signals, respectively, with predetermined error rates with respect to the second regenerated signal.

A significant advantage of a regenerator in accordance with the invention is that it facilitates the provision of indicating means, responsive to a difference between the threshold levels, for providing a performance indication. The regenerator may also include means for modifying a sampling time of the regenerating means to maximize a difference between the first and third threshold levels, whereby the regeneration sampling time is adapted as well as the regeneration threshold level.

The invention further provides a method of regenerating a binary data signal comprising the steps of: comparing the data signal with first, second, and third threshold levels to provide respectively first, second, and third regenerated signals; comparing the first regenerated signal with the second regenerated signal and controlling the first threshold level in dependence upon the comparison to maintain a predetermined error rate of the first regenerated signal with respect to the second regenerated signal; comparing the third regenerated signal with the second regenerated signal and controlling the third threshold level in dependence upon the comparison to maintain a predetermined error rate of the third regenerated signal with respect to the second regenerated signal; and producing the second threshold level so that it lies between the first and third threshold levels.

The method may further include the step of modifying a comparison time of the data signal with the threshold levels to maximize a difference between the first and third threshold levels.

Preferably the second threshold level is produced with a predetermined ratio to the first and third threshold levels.

Figure 2A:
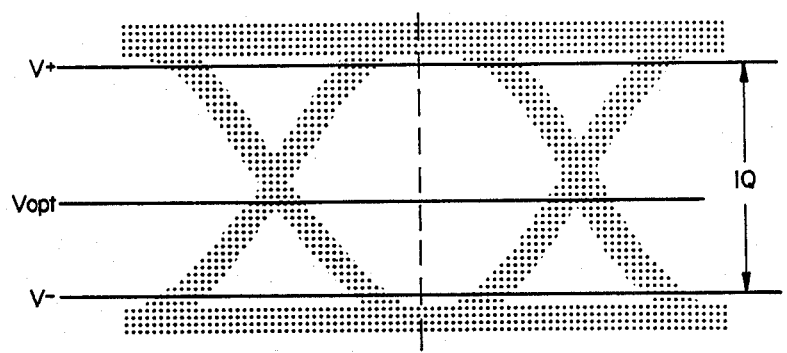
Figure 2B:
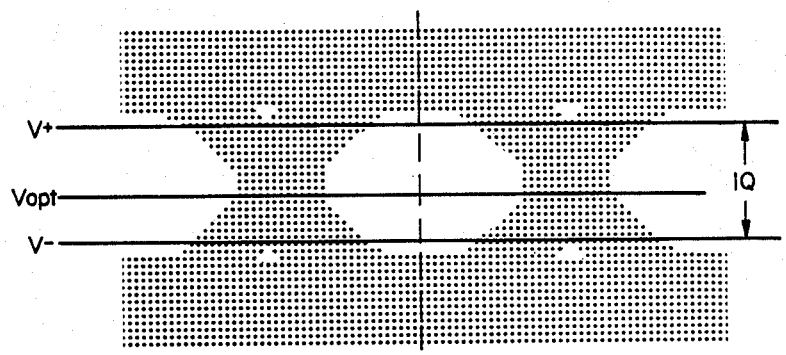
Figure 2C:
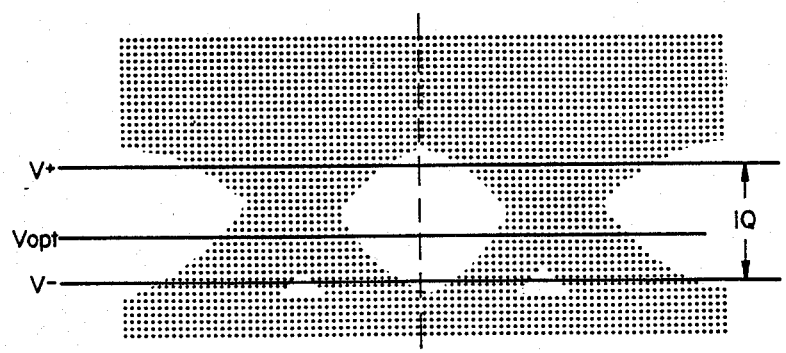
Figure 3:
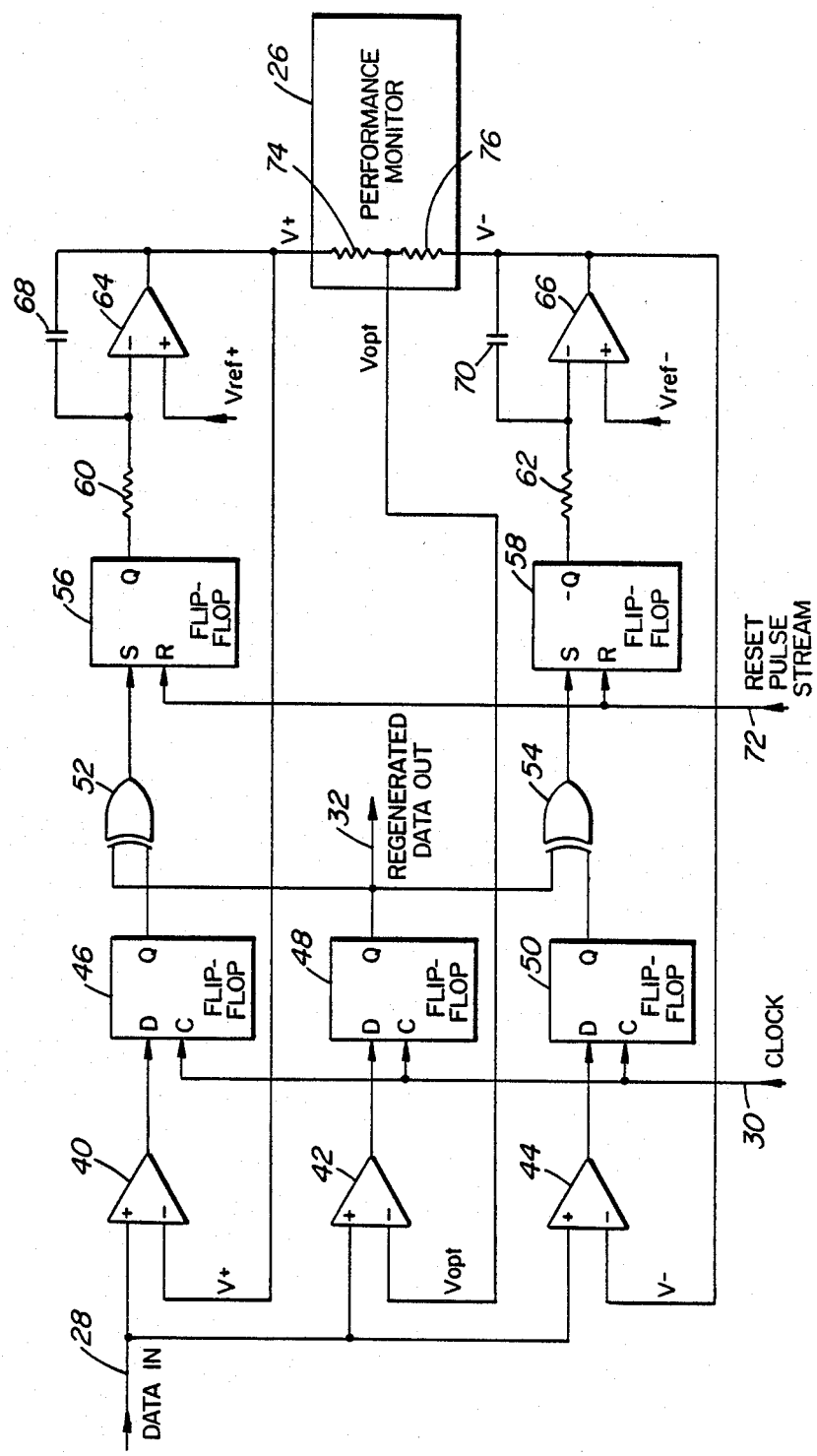
Figure 4:
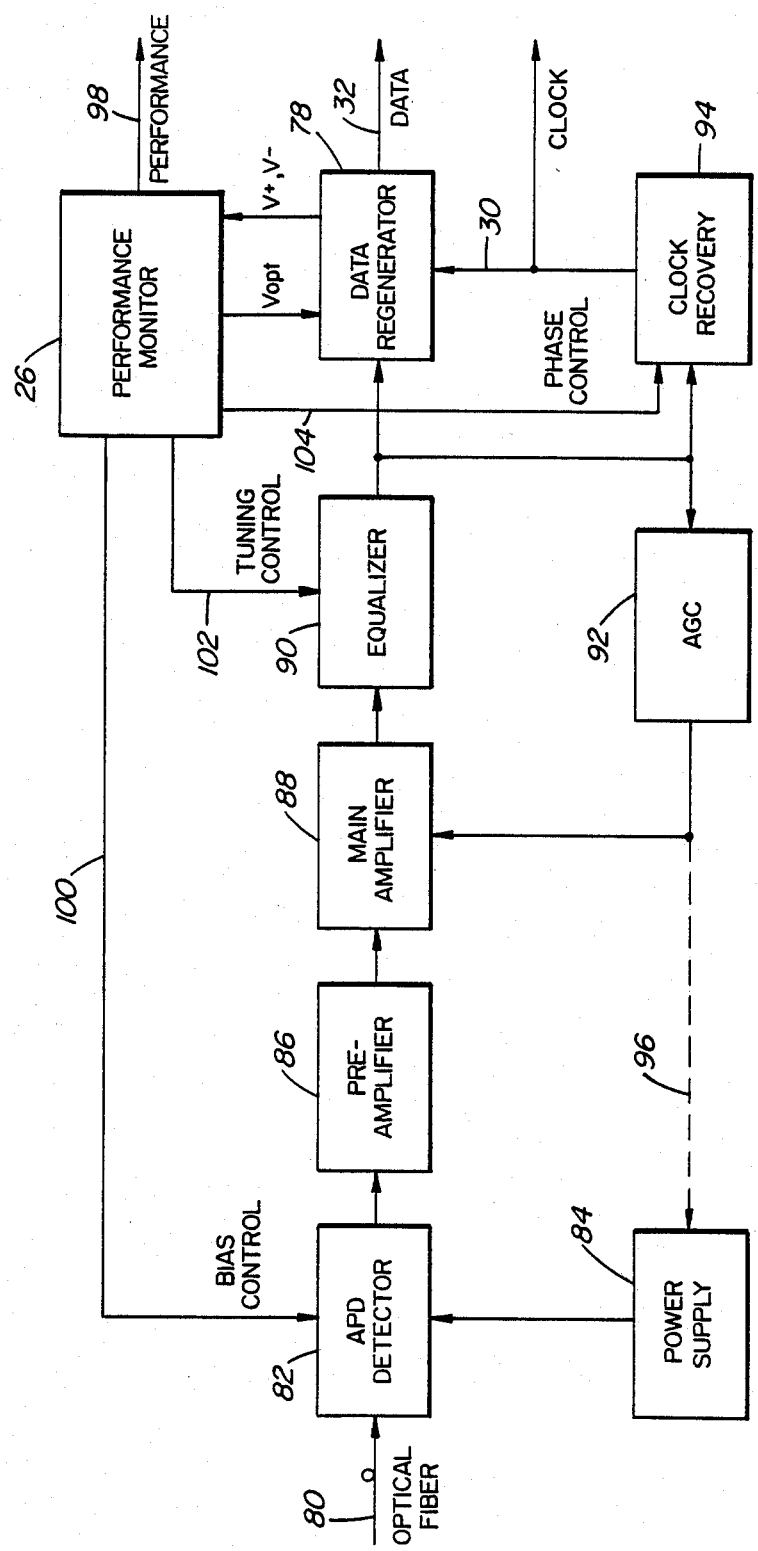

The invention will be further understood from the following description with reference to the accompanying drawings, in which:

FIG. 1 is a block diagram illustrating a binary data regenerator in accordance with an embodiment of the invention;

FIGS. 2a, 2b, and 2c show eye closure diagrams illustrating operation of the regenerator;

FIG. 3 is a circuit diagram illustrating one form of the binary data regenerator of FIG. 1; and FIG. 4 is a block diagram of an optical fiber signal receiver incorporating a binary data regenerator in accordance with an embodiment of the invention.

Referring to FIG. 1, a binary data regenerator in accordance with an embodiment of the invention comprises three two-level A-D (analog-to-digital) converters 10, 12, and 14, three retiming circuits 16, 18, and 20, two error counting circuits 22 and 24, and a performance monitor 26.

An incoming binary data signal to be regenerated is supplied via a data input line 28 to a non-inverting (+) input of each of the converters 10, 12, and 14, to the inverting (−) inputs of which comparison or threshold levels V+, Vopt, and V− respectively are supplied from the performance monitor 26. The digital output signals of the converters 10, 12, and 14 are retimed by the retiming circuits 16, 18, and 20 respectively, which are clocked at the binary data signal frequency by a recovered clock signal on a line 30.

A regenerated binary data output signal is produced by the retiming circuit 18 and is supplied to an output data line 32 and to an input of each of the error counting circuits 22 and 24. Errored regenerated data at the output of the retiming circuit 16 is supplied to another input of the error counting circuit 22, and errored regenerated data at the output of the retiming circuit 20 is supplied to another input of the error counting circuit 24. Outputs of the error counting circuits 22 and 24 are connected to the performance monitor 26 for controlling the threshold levels V+, Vopt, and V− as described in detail below.

The operation of the data regenerator of FIG. 1 is described below with reference to the eye closure diagrams of FIGS. 2a, 2b, and 2c. Each of FIGS. 2a, 2b, and 2c shows an eye closure diagram together with a vertical line, representing a signal sampling time corresponding to the timing of the clock signal on the line 30, and horizontal lines representing the threshold levels V+, Vopt, and V−. FIG. 2a shows a relatively open eye with a relatively large difference between the voltages V+ and V−, FIG. 2b shows a relatively closed eye with a consequent smaller difference between the voltages V+ and V−, indicating a relatively degraded incoming binary data signal, and FIG. 2c shows a non-symmetrical eye.

The performance monitor 26 produces the threshold level V+ at such a voltage that a predetermined bit error rate, on binary ones of the data signal, is produced in data at the output of the retiming circuit 16 relative to data on the output line 32, and hence is detected by the error detection circuit 22. Similarly, the performance monitor 26 produces the threshold level V− at such a voltage that a predetermined bit error rate, on binary zeros of the data signal, is produced in data at the output of the retiming circuit 20 relative to data on the output line 32, and hence is detected by the error detection circuit 24. The predetermined bit error rates are conveniently the same, for example each being about $10^{-6}$.

The performance monitor 26 produces the threshold level Vopt so that it has an optimal value between the threshold levels V+ and V−, with a predetermined ratio thereto. For example, the performance monitor 26 may produce this threshold level so that Vopt=V−+k(V+ −V−), where k is a positive fraction chosen for an optimal threshold level Vopt. As typically the error density for binary ones is greater than that for binary zeros, the value of k would be typically less than 0.5; for example k may be in the range from 0.3 to 0.5.

As should be appreciated from the foregoing description, the threshold level Vopt is positioned optimally, in an adaptive manner in dependence upon the threshold levels V+ and V− which correspond to predetermined error rates, regardless of the particular nature and extent to which the incoming binary data signal is degraded. In consequence, manual presetting of the threshold level as in the prior art is avoided, and the data regenerator automatically adjusts itself to provide an optimal data signal regeneration regardless of signal variations due to received signal power, temperature, aging, and so on.

The data regenerator of FIG. 1 can be implemented in a variety of ways, in particular using analog and/or digital techniques. FIG. 3 illustrates in more detail one implementation of the data regenerator.

Referring to FIG. 3, the A-D converters 10, 12, and 14 of FIG. 1 are one-bit A-D converters constituted by comparators formed by differential amplifiers 40, 42, and 44 respectively, the non-inverting inputs of which are supplied with the data signal from the line 28 and to the inverting inputs of which are applied the respective threshold levels V+, Vopt, and V−. The retiming circuits 16, 18, and 20 of FIG. 1 are constituted by D-type flip-flops 46, 48, and 50 respectively, the data inputs D of which are supplied with the outputs from the respective amplifiers 40, 42, and 44 and the clock inputs C of which are supplied with the recovered clock signal on the line 30.

The regenerated binary data output signal is produced at a Q output of the flip-flop 48 and is supplied to the output data line 32 and to one input of each of two Exclusive-OR gates 52 and 54, second inputs of which are connected to Q outputs of the flip-flops 46 and 50 respectively. The gate 52 or 54 consequently produces a logic one output whenever regenerated data at the output of the respective flip-flop 46 or 50 is in error relative to the regenerated data on the line 32. The gate 52, a set-reset flip-flop 56, and a difference integrator comprising a series resistor 60, differential amplifier 64, and feedback capacitor 68 together constitute the error counting circuit 22. Similarly the gate 54, a set-reset flip-flop 58, and a difference integrator comprising a series resistor 62, differential amplifier 66, and feedback capacitor 70 together constitute the error counting circuit 24.

The output of the gate 52 or 54 is connected to a set input S of the flip-flop 56 or 58, respectively, and a reset pulse stream is supplied via a line 72 to a reset input R of each flip-flop 56 and 58. The reset pulse stream is a constant stream of pulses, at a frequency which is typically much lower than the frequency of the clock signal and which may be synchronous or asynchronous thereto, which serve to reset the flip-flops 56 and 58 at a constant rate. For example, for a data rate of the order of 1 Gb/s or more, the reset pulse stream may comprise pulses with a frequency in the range typically from about 100 Hz to about 10 kHz, or possibly up to about 50 MHz, with a small duty cycle for example of about 1%. The flip-flops 56 and 58 thus act as pulse stretchers, converting short and occasional logic ones at their set inputs into longer duration pulses for integration by the subsequent circuitry.

Thus the flip-flop 56 is set in dependence upon errors in the data at the output of the flip-flop 46, and is reset by the reset pulse stream, whereby it produces at its output Q a pulse stream, at the reset pulse frequency, whose average duty cycle is dependent upon the data error rate. The difference integrator formed by the components 60, 64, and 68 produces at its output the voltage V+, which is supplied to the inverting input of the differential amplifier 40, by integrating this pulse stream with respect to a fixed d.c. reference voltage Vref+ which is supplied to the non-inverting input of the differential amplifier 64.

Correspondingly, the flip-flop 58 is set in dependence upon errors in the data at the output of the flip-flop 50, and is reset by the reset pulse stream, whereby it produces at its inverting output −Q a pulse stream, at the reset pulse frequency, whose average duty cycle is dependent upon the data error rate. The difference integrator formed by the components 62, 66, and 70 produces at its output the voltage V−, which is supplied to the inverting input of the differential amplifier 14, by integrating this pulse stream with respect to a fixed d.c. reference voltage Vref− which is supplied to the noninverting input of the differential amplifier 66.

The reset pulse stream frequency and the reference voltages Vref+ and Vref− are selected so that the error rates in the data at the outputs of the flip-flops 46 and 50 have predetermined values, for example each being about $10^{-6}$, as already described.

The threshold levels V+ and V− are in this case produced directly by the error counting circuits, and are supplied to the performance monitor 26. In the performance monitor 26 a potential divider, formed by resistors 74 and 76, is supplied with these threshold level voltages and produces the optimum threshold level Vopt at its tapping point, as shown in FIG. 3. The resistances of the resistors 74 and 76 are selected in accordance with the desired value of k.

The voltage difference between the voltages V+ and V− is a measure of the quality of the incoming binary data signal, and can be used by the performance monitor 26 to provide a performance indication. For a given quality of the incoming binary data signal, this voltage difference is also an accurate, and rapidly provided and updated, indication of the quality of the data regeneration by the data regenerator and associated circuitry.

Accordingly, this voltage difference, referenced IQ in FIGS. 2a, 2b, and 2c, can be used directly as a measure of quality or performance. Furthermore, because of the speed with which this parameter is updated, this parameter IQ can be used actively to permit continual adjustment of circuitry for the best possible operation, i.e. the largest IQ, in any particular conditions. This is described further below with reference to FIG. 4.

FIG. 4 shows an optical fiber signal receiver including a data regenerator, referenced 78, and performance monitor 26 as described above. In addition, the receiver comprises an incoming optical fiber 80, an APD detector 82 and associated power supply 84, a signal preamplifier 86, a main signal amplifier 88, an equalizer 90, an AGC (automatic gain control) circuit 92, and a clock recovery circuit 94. In such a receiver, an optical signal modulated with binary data at a bit rate of the order of Mb/s up to several Gb/s is detected by the detector 82, and the resulting signal is amplified and equalized by the units 86, 88, and 90 before being subjected to clock recovery in the circuit 94 and data regeneration as described above in the regenerator 78. The AGC circuit 92 is responsive to the equalized signal to control the gain of the main amplifier 88, and optionally (as represented by a broken line 96) also the APD power supply 84. The circuit 94 produces the clock signal on the line 30, the regenerator produces regenerated data on the line 32, and the performance monitor 26 produces a performance output signal, dependent on the parameter IQ, on an output line 98. The AGC circuit 92 maintains a constant peak-to-peak amplitude of the data signal supplied to the regenerator, so that the parameter IQ is normalized with respect to the signal amplitude.

In addition, in the receiver of FIG. 4 control lines 100, 102, and 104 extend from the performance monitor 26 respectively to the APD detector 82 (this line could alternatively be shown as going to the power supply 84) for controlling the bias of the APD, to the equalizer 90 for bandwidth control, and to the clock recovery circuit 94 for phase control of the clock signal. Each of these parameters, which affect the eye closure diagram or bit error rate and hence the parameter Q, is thereby enabled to be controlled by the performance monitor 26, which also serves in this case as a performance optimizer. Other parameters, also affecting the eye closure diagram or bit error rate, may be controlled in a similar manner. For example, characteristics of the preamplifier 86, main amplifier 88, and/or AGC circuit 92 may be similarly controlled, and the performance monitor 26 may also be arranged to control the value k discussed above.

The performance monitor 26 in this case comprises a microprocessor which operates in a closed loop, adjusting each of the controlled parameters independently and sequentially in turn, to achieve the greatest value IQ. This operation may occur continuously, or it may be arranged to occur only when the parameter IQ falls below a predetermined level.

Independently for each controlled parameter, via the respective line 100, 102, or 104 the microprocessor in the performance monitor 26 varies the parameter in either direction and monitors the value of IQ accordingly, finally setting the parameter to that value which gives the greatest value of IQ. These steps are then repeated for the next controlled parameter in turn.

By way of example, it is observed that the clock recovery circuit 94 may comprise a voltage controlled oscillator and PLL (phase locked loop) of known form. In such a circuit the PLL includes a phase comparator to one input of which a reference voltage, for example ground potential, is conventionally applied. The performance monitor 26 can be readily arranged to vary this reference voltage, within prescribed limits, via the control line 104 thereby to vary the phase of the clock signal on the line 30. This phase shifting corresponds to a shifting to the left or the right of the vertical line in FIGS. 2a, 2b, and 2c.

The other controlled parameters may be varied in a similar manner. In addition, the performance monitor 26 may be arranged to set all of the controlled parameters to predetermined default values for initial setting up, checking, and other purposes.

Although the data regenerator has been described above, with reference to FIG. 3, in an analog form using differential integrators for the error counting circuits, this need not be the case. Instead of the differential integrators described, and especially with higher frequencies of the reset pulse stream, digital counters may be used to count output pulses from the flip-flops 56 and 58, the resulting counts being supplied to the performance monitor 26 and being used to determine the threshold levels V+, Vopt, and V− and the parameter IQ therein.

In addition, instead of a separate Exclusive-OR gate 52 or 54 and flip-flop 56 or 58 as shown in FIG. 3, the same function may be provided by a set-reset flip-flop with gated inputs supplied with the output of the flip-flop 48, the output of the respective flip-flop 46 or 50, and the reset pulse stream. The input gating of such flip-flops is simplified by the fact that only three states need be handled: for example, the Q outputs of the flip-flops 46 and 48 can be both zero, both one, or respectively one and zero, but they can not be respectively zero and one.

Furthermore, it should be appreciated that the functions of the comparator 40, 42, or 44 and the flip-flop 46, 48, or 50 respectively can be combined into a single clocked comparator circuit.

Numerous other modifications, variations, and adaptations may be made to the described embodiments of the invention without departing from the scope of the invention as defined in the claims.

What is claimed is:

1. A regenerator comprising:
   means for regenerating a data signal with respect to first, second and third threshold levels to produce respectively first, second and third regenerated signals;
   means for controlling the first threshold level in dependence upon differences between the first and second regenerated signals;
   means for controlling the third threshold level in dependence upon differences between the second and third regenerated signals; and
   means for determining the second threshold level, the means for determining the second threshold level being responsive to the first and third threshold levels to produce the second threshold level therebetween.

2. A regenerator as claimed in claim 1 wherein the means for controlling the first and third threshold levels comprise means for maintaining the first and third regenerated signals, respectively, with predetermined error rates with respect to the second regenerated signal.

3. A regenerator as claimed in claim 2 wherein the means for controlling the first threshold level comprises means for integrating a signal, dependent upon differences between the first and second regenerated signals, to produce the first threshold level, and the means for controlling the third threshold level comprises means for integrating a signal, dependent upon differences between the second and third regenerated signals, to produce the third threshold level.

4. A regenerator as claimed in claim 3 wherein the means for controlling the first threshold level further comprises means for gating together the first and second regenerated signals, and the means for controlling the third threshold level further comprises means for gating together the second and third regenerated signals.

5. A regenerator as claimed in claim 1 wherein the means for determining the second threshold level comprises means for producing the second threshold level with a predetermined ratio to the first and third threshold levels.

6. A regenerator as claimed in claim 1 and including indicating means responsive to a difference between the threshold levels.

7. A regenerator as claimed in claim 1 and including means for modifying a sampling time of the regenerating means to maximize a difference between the first and third threshold levels.

8. A method of regenerating a binary data signal comprising the steps of:
   comparing the data signal with first, second, and third threshold levels to produce respectively first, second, and third regenerated signals;
   comparing the first regenerated signal with the second regenerated signal and controlling the first threshold level in dependence upon the comparison to maintain a predetermined error rate of the first regenerated signal with respect to the second regenerated signal;
   comparing the third regenerated signal with the second regenerated signal and controlling the third threshold level in dependence upon the comparison to maintain a predetermined error rate of the third regenerated signal with respect to the second regenerated signal; and
   producing the second threshold level so that it lies between the first and third threshold levels.

9. A method as claimed in claim 8 and including the step of modifying a comparison time of the data signal with the threshold levels to maximize a difference between the first and third threshold levels.

10. A method as claimed in claim 8 wherein the second threshold level is produced with a predetermined ratio to the first and third threshold levels.

* * * * *